US012162678B2

(12) United States Patent
Wollman

(10) Patent No.: US 12,162,678 B2
(45) Date of Patent: Dec. 10, 2024

(54) DUST PAN FOR A UTILITY BUCKET

(71) Applicant: QUIK LID, LLC, Redlands, CA (US)

(72) Inventor: David Wollman, Redlands, CA (US)

(73) Assignee: QUIK LID, LLC, Redlands, CA (US)

( * ) Notice: Subject to any disclaimer, the term of this patent is extended or adjusted under 35 U.S.C. 154(b) by 0 days.

(21) Appl. No.: 17/314,222

(22) Filed: May 7, 2021

(65) Prior Publication Data

US 2021/0347565 A1 Nov. 11, 2021

Related U.S. Application Data

(60) Provisional application No. 63/021,997, filed on May 8, 2020.

(51) Int. Cl.
*B65F 1/10* (2006.01)
*A47L 13/52* (2006.01)

(52) U.S. Cl.
CPC ................ *B65F 1/10* (2013.01); *A47L 13/52* (2013.01); *B65F 2210/136* (2013.01)

(58) Field of Classification Search
CPC ....... B66F 1/10; B66F 2210/136; A47L 13/52
USPC .............................................. 15/257.1–257.9
See application file for complete search history.

(56) References Cited

U.S. PATENT DOCUMENTS

| | | | | |
|---|---|---|---|---|
| 4,312,531 | A | 1/1982 | Cross | |
| 4,470,627 | A | 9/1984 | Carroll et al. | |
| 4,802,258 | A | 2/1989 | Jensen | |
| 6,974,167 | B2 | 12/2005 | Springs, II | |
| 9,480,383 | B2 | 11/2016 | Wollman | |
| 9,655,492 | B2 | 5/2017 | Schiavo et al. | |
| 10,029,849 | B1 | 7/2018 | Genotti, III | |
| 11,167,886 | B1 * | 11/2021 | Schuster | B65D 25/20 |
| 2004/0124195 | A1 * | 7/2004 | Mensch | B65F 1/14 15/257.1 |
| 2011/0283474 | A1 | 11/2011 | McCoy et al. | |
| 2016/0037994 | A1 * | 2/2016 | Wollman | B65F 1/10 15/257.7 |
| 2016/0242618 | A1 * | 8/2016 | Schiavo | A47L 13/52 |

* cited by examiner

*Primary Examiner* — Tom Rodgers
(74) *Attorney, Agent, or Firm* — Jacob M. Ward; Ward Law Office LLC

(57) ABSTRACT

An attachment for a utility bucket having a rim includes a rim engagement portion for engaging the rim of the utility bucket in a releasably locked engagement and a ramped portion, which extends from the rim engagement portion. The ramped portion can include an inclined portion which can have a back edge, a dust pan blade, and sidewalls that extend from a free edge of the dust pan blade to the engagement portion. The sidewalls can be both angled and curved. The dust pan blade can include a plurality of blade ribs formed on a bottom surface thereof.

18 Claims, 3 Drawing Sheets

DUST PAN FOR A UTILITY BUCKET

CROSS-REFERENCE TO RELATED APPLICATIONS

This application claims the benefit of U.S. Provisional Application Ser. No. 63/021,997 filed on May 8, 2020. The entire disclosure of the above application is incorporated herein by reference.

FIELD

The present disclosure relates to dust pans, and more particularly, a dust pan for a utility bucket.

INTRODUCTION

This section provides background information related to the present disclosure which is not necessarily prior art.

It is common to collect debris from a surface with a dust pan and deposit it into a utility bucket. Presently, in order to contain large amounts of debris and/or liquids, the utility bucket must remain upright while the user scoops the debris and places it into the interior of the utility bucket. If the user were to lay the utility bucket on its side for easy access to sweep debris into the bucket interior, liquids and debris can exit the bucket or hinder new debris from being swept in.

A device is needed that enables a user to conveniently lay a utility bucket on its side so that debris and liquids can be swept into the bucket, while substantially preventing debris and liquids from exiting. One such device is shown and described in U.S. Pat. No. 9,480,383 to Wollman, the entire disclosure of which is incorporated herein by reference.

There is a continuing need for a dust pan for a utility bucket. Desirably, the dust pan militates against debris from falling out of the dust pan and not being channeled into the utility bucket.

SUMMARY

In concordance with the instant disclosure, a dust pan for a utility bucket, and which militates against debris from falling out of the dust pan and not being channeled into the utility bucket has been surprisingly discovered.

The present disclosure is directed to a dust pan attachment for a utility bucket having a rim. The attachment can provide multiple advantages over similar devices. In particular, the attachment can include blade ribs, which can improve the structural integrity of the attachment, sidewalls that extend to a free end of a rim engagement portion, which increase the collection area of the attachment, and angled and curved sidewalls, which improve the flow of material from the attachment to the utility bucket. The attachment can include a rim engagement portion for engaging the rim of the utility bucket in a releasably locked engagement and a ramped portion, which extends from the rim engagement portion. The ramped portion can include an inclined portion and a dust pan blade. The dust pan blade can include a plurality of blade ribs formed on a bottom surface thereof.

In exemplary embodiments, the dust pan can have a rim engagement portion for engaging the rim of the utility bucket in releasably locked engagement; a ramped portion extending from the rim engagement portion, the ramped portion having a leading edge and a back edge, the back edge of the ramped portion extending across the rim engagement portion to connect with the rim engagement portion at a first part and a second part along the rim engagement portion; and a waste retention wall spanning an area between the rim engagement portion and the back edge of the ramped portion. When the attachment is attached to the utility bucket, which is laid horizontally, the leading edge of the ramped portion can touch the surface and the ramped portion angularly extends to the opening of the utility bucket. Additionally, the waste can be moved up the ramped portion, over the back edge, and into the interior space of the utility bucket, the waste retention wall substantially preventing the waste from exiting the interior space of the utility bucket.

Optionally, the rim engagement portion further can have a top portion and a bottom portion, a rim engagement groove being formed on the bottom portion. One or both of the rim engagement portion and rim engagement groove can be semiannular. The waste retention wall can be a solid wall.

As another option, the curved rim engagement portion can form a water-resistant engagement with the rim of the utility bucket, where the solid wall prevents waste water from exiting the interior space of the utility bucket. Optionally, the rim is circular with a diameter, and the rim engagement portion conforms at least in part to the rim. The area between the rim engagement portion and the back edge of the ramped portion can be circular segment shaped, and the waste retention wall spans an entirety of the area.

As an option, the height of the waste retention wall can be defined by the back edge, the height ranging approximately between one-tenth and one-half the diameter or can range approximately between one inch and 8 inches.

An alternate dust pan for a utility bucket can include a curved frame with a rim engagement groove, where the rim engagement groove is configured for receiving the circular rim of the utility bucket in releasably locked engagement, and the curved frame has a first part and a second part situated along a curve of the curved frame; a ramp extending across the curved frame to connect with the first part and the second part, where a segment area is defined within the curve, the first part, and the second part; and a waste retention wall at least partially spanning the segment area. When the attachment is attached to the circular rim of the utility bucket, which is laid horizontally, the ramped portion can touch the surface and the ramped portion angularly extends to the opening of the utility bucket. And when waste is moved up the ramped portion and into the interior space of the utility bucket, the waste retention wall can substantially militate against the waste from exiting the interior space of the utility bucket.

Optionally, the rim engagement groove can form a water-resistant engagement with the rim of the utility bucket, the waste retention wall can be configured for preventing waste water from exiting the interior space of the utility bucket. The waste retention wall can span an entirety the segment area. As an option, the ramp can further have a back edge proximal to the curved frame and a leading edge distal to the curved frame. Again optionally, the rim engagement groove can have an inner curved wall concentric within an outer curved wall, where the outer curved wall is segmented into two or more wall sections, and at least one of the wall sections having a tab extending radially from an outer side of the wall section.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
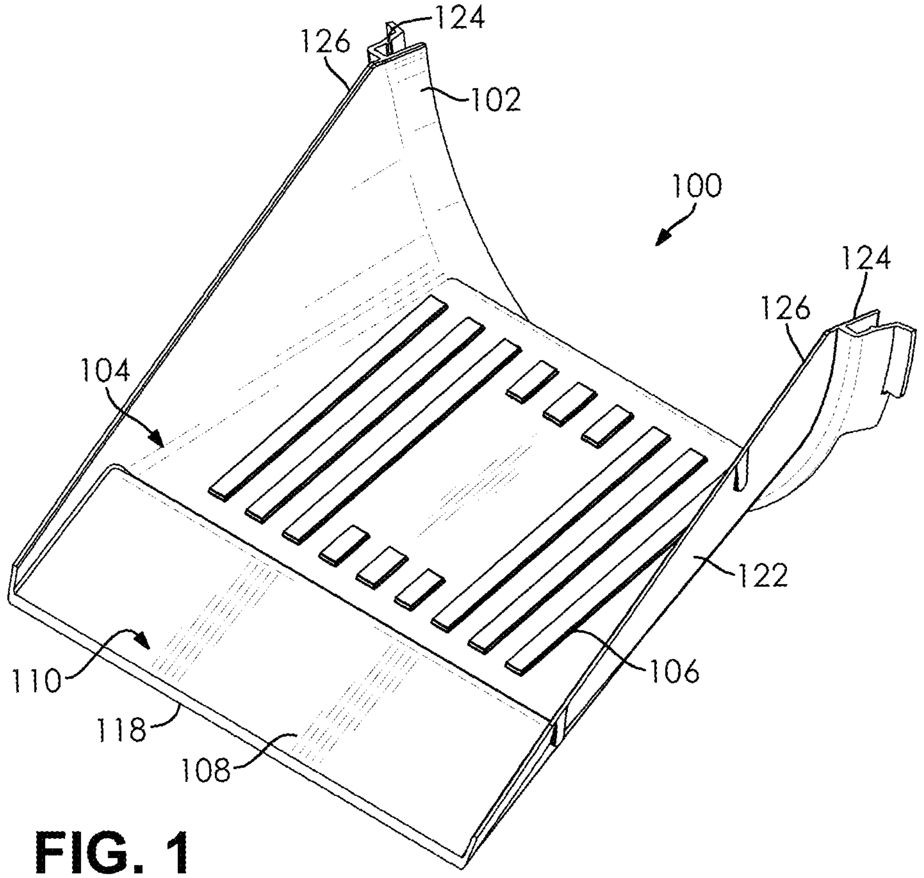
FIG. 1 is top perspective view of a dust pan for a utility bucket according to one embodiment of the present disclosure.

The following description of technology is merely exemplary in nature of the subject matter, manufacture and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. “A” and “an” as used herein indicate “at least one” of the item is present; a plurality of such items can be present, when possible. Except where otherwise expressly indicated, all numerical quantities in this description are to be understood as modified by the word “about” and all geometric and spatial descriptors are to be understood as modified by the word “substantially” in describing the broadest scope of the technology. “About” when applied to numerical values indicates that the calculation or the measurement allows some slight imprecision in the value (with some approach to exactness in the value; approximately or reasonably close to the value; nearly). If, for some reason, the imprecision provided by “about” and/or “substantially” is not otherwise understood in the art with this ordinary meaning, then “about” and/or “substantially” as used herein indicates at least variations that can arise from ordinary methods of measuring or using such parameters.

Although the open-ended term “comprising,” as a synonym of non-restrictive terms such as including, containing, or having, is used herein to describe and claim embodiments of the present technology, embodiments can alternatively be described using more limiting terms such as “consisting of” or “consisting essentially of.” Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that can be recited in the art, even though element D is not explicitly described as being excluded herein.

When an element or layer is referred to as being “on,” “engaged to,” “connected to,” or “coupled to” another element or layer, it can be directly on, engaged, connected, or coupled to the other element or layer, or intervening elements or layers can be present. In contrast, when an element is referred to as being “directly on,” “directly engaged to,” “directly connected to” or “directly coupled to” another element or layer, there can be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer, or section from another region, layer, or section. Terms such as “first,” “second,” and other numerical terms when used herein do not imply a sequence or order unless clearly indicated by the context. Thus, a first element, component, region, layer, or section discussed below can be termed a second element, component, region, layer, or section without departing from the teachings of the example embodiments.

Spatially relative terms, such as “inner,” “outer,” “beneath,” “below,” “lower,” “above,” “upper,” and the like, can be used herein for ease of description to describe one element or feature’s relationship to another element(s) or feature(s) as illustrated in the figures. Spatially relative terms can be intended to encompass different orientations of the device in use or operation in addition to the orientation depicted in the figures. For example, if the device in the figures is turned over, elements described as “below” or “beneath” other elements or features can then be oriented “above” the other elements or features. Thus, the example term “below” can encompass both an orientation of above and below. The device can be otherwise oriented (rotated 90 degrees or at other orientations) and the spatially relative descriptors used herein interpreted accordingly.

As shown in FIGS. 1-6, a dust pan attachment 100 for a utility bucket 101 is shown. The attachment 100 can include a curved frame or rim engagement portion 102. The rim engagement portion 102 can be configured to engage a rim 103 of the utility bucket 101. The attachment 100 can include a ramped portion 104, which can extend from the curved frame 102. The ramped portion 104 can be configured to guide debris and/or liquids up into the utility bucket 101, in operation, as described in greater detail hereinbelow.

Figure 5:
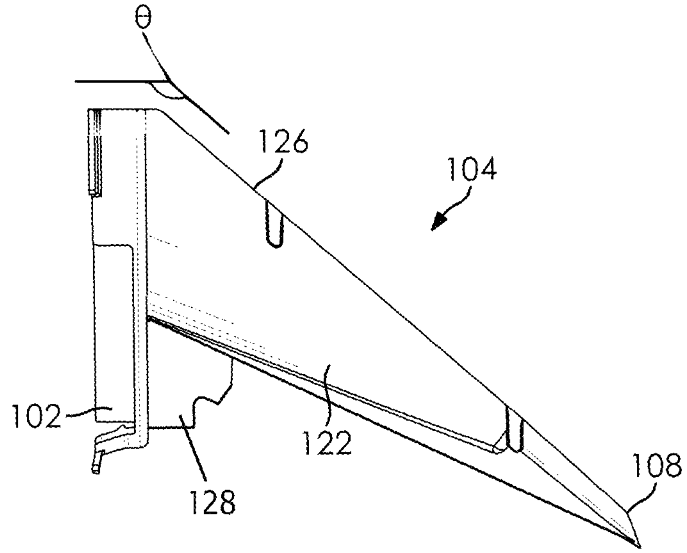
FIG. 5 is a side elevational view of the dust pan of FIG. 1.
Figure 6:
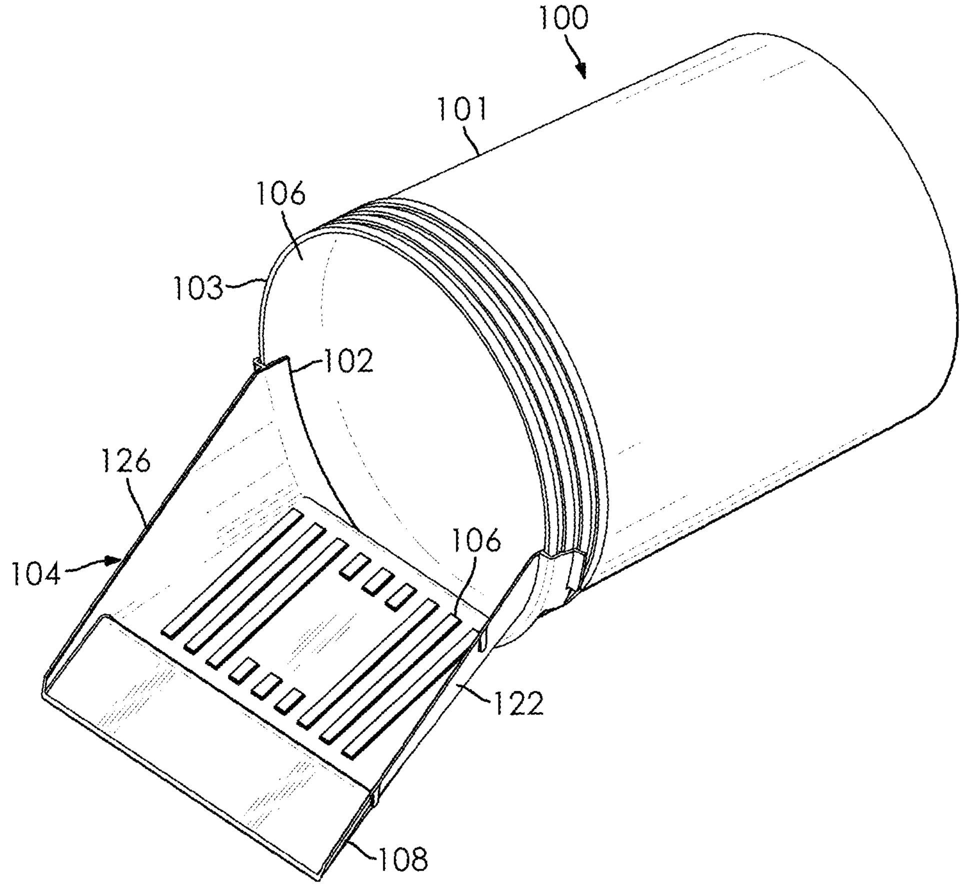
FIG. 6 is a top perspective view of the dust pan of FIG. 1, further depicted attached to a utility bucket.

The ramped portion 104 can include an inclined portion 106 with a dust pan blade 108 extending therefrom. Each of the inclined portion 106 and the dust pan blade 108 can have an upper surface 110 and a bottom surface 112. The dust pan blade 108 can extend from the inclined portion 106 an angle, such that, the dust pan blade 108 can contact the ground, while the inclined portion 106 can be disposed above the ground, in operation. Advantageously, the dust pan blade 108 can be configured to contact the ground and militate against the debris from going underneath the attachment 100, in operation. Furthermore, as shown in FIGS. 2 and 5, the attachment 100 can include a rib 128 disposed on a bottom surface of the attachment 100 to connect the inclined portion 106 of the ramped portion 104 to the rim engagement portion 102.

Figure 2:
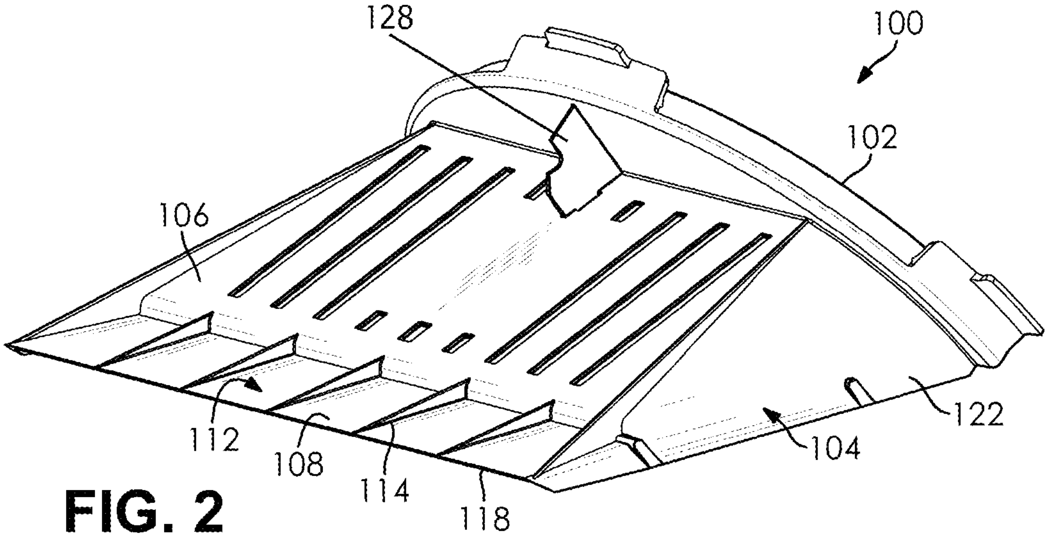
FIG. 2 is a bottom perspective view of the dust pan of FIG. 1.

With reference to FIG. 2, the ramped portion 104 can include a plurality of blade ribs 114. In particular, the blade ribs 114 can be disposed or formed in the bottom surface 112 of the dust pan blade 108. The blade ribs 114 can be disposed adjacent to the bottom surface 112 of the inclined portion 106, and can extend towards a straight, free edge 118 of the dust pan blade 108. In certain embodiments, the blade ribs 114 can be tapered. In other words, a height of each of the blade ribs 114 can gradually decrease along a length of the blade rib 114 extending from adjacent to the inclined portion 106 to the free edge 118 of the dust pan blade 108.

It should be appreciated that the blade ribs 114 can increase durability and stability of the attachment 100. Without being bound to a particular theory, it is believed that the blade ribs 114 can militate against the dust pan blade 108 from being warped during manufacture via an injection molding process and can continue to militate against warpage of the dust pan blade 108 in operation or storage. When the dust pan blade warps, the free edge 118 cannot lay flat against the ground, which can allow debris to flow under the dust pan, in operation. The blade ribs 114 and the free edge 118 can work in conjunction to provide superior performance in preventing fine particles from being swept underneath the dust pan blade 108 of the attachment 100. By bracing the free edge 118 to the inclined portion 106 of the dust pan blade 108, the dust pan blade 108 and free edge 118 thereof are structurally stabilized when contacting debris of various sizes, including fine particles, and are structurally stabilized when contacting the force of a sweeping implement (e.g., broom). Stabilization reduces any warping and deformation, however temporary, that may let fine particles, such as sand, dust, metal shavings, etc., underneath the dust pan blade 108, which would then require repositioning the attachment 100 and associated utility bucket 101 and resweeping of the debris. The blade ribs 114 are therefore able to impart improved contact between the free edge 118 and the surface to be swept, especially where the surface is very smooth and flat. Additionally, the blade ribs 114 can provide rigidity to the dust pan blade 108, in operation, allowing relatively large debris to be moved along the dust pan blade 108 without warping the dust pan blade 108. It is not preferable to form other rigidizing structures, such as corrugations, in the dust pan blade 108, as such corrugations would allow fine particles to undesirably pass between gaps or ridges of such corrugations and hence underneath the dust pan 100. It should be appreciated that a person skilled in the art can scale the number of blade ribs 114, within the scope of this disclosure.

A ramp portion 104 can include further rigidizing structures, which can include a series of ribs or corrugations formed in the sheet material of the upper surface 110 to substantially prevent bending along the ramp incline. A shoulder can be formed across the ramp surface, which can permit dust and small debris to pass over the shoulder flowing towards a back edge 120, yet substantially prevents backflow of this debris towards the leading edge once over the shoulder.

With renewed reference to FIGS. 1-4, the ramp portion 104 can include a leading edge, the back edge 120 or back portion, and sidewalls 122 on opposite sides of the ramp portion 104. Though the ramp portion 104 is shown connected to the top portion of the curved frame 102, it should be appreciated that the ramp can be molded to various parts of the curved frame 102 as required. The sidewalls 122 connect the ramp portion 104 to the curved frame 102 to increase rigidity and strength of the ramp portion 104 and to further control the flow of debris swept up the ramp, and will be discussed in greater detail hereinbelow.

The back edge 120 of the ramp 104 can intersect or connect with the inner curved wall of the curved frame 102 at a first frame part and a second frame part. The first frame part and the second frame part can be on different portions of the curved frame 102; and if the curved frame 102 were to be circular, the back edge 120 can be much like a chord of a circle connecting the first frame part and the second frame part on the circle. Again, if the curved frame 102 were to be circular, the area between the back edge 120 and the curved frame 102, in this case the inner curved wall, forms a segment area, which is much like the segment of a circle. The area is preferably spanned by a waste retention wall, which also looks much like a segment of a circle in this example. The main purpose of the waste retention wall is to prevent waste from exiting the utility bucket 101 once swept in.

The curved frame 102 can have an annular channel or rim engagement groove formed on a bottom portion or wall, where the groove can have an inner curved wall spaced apart and concentric within an outer curved wall. An engagement lip can be formed on an inside wall of the groove, in between the inner curved wall and the outer curved wall. The engagement lip can be ramped to permit the rim 103 of the bucket 101 to push out the outer curved wall and trap the rim 103 within the groove until the user disengages the rim 103.

To ease removal of the attachment 100 from the utility bucket 101, the outer curved wall can be segmented into one or more wall sections. Each wall section can have the engagement lip on the inside wall of the outer curved wall. Extending radially from the outer curved wall of each wall section can be a tab. By sectioning the outer curved wall and providing tabs on each wall section, the user can easily remove the attachment 100 from the utility bucket 101 by successively pulling each wall section outward and away from the rim 103 by grasping the tab and pulling to disengage the bucket rim from the engagement lip. Extending from the curved frame 102 can be a handle, that can enable the user to hold and transport the utility bucket 101 and attachment 100 together by hooking one or more fingers about the handle.

With renewed reference to FIGS. 1-4, each of the sidewalls 122 can extend from the ramp portion 104 to the curved frame 102. In particular, each of the sidewalls 122 can have a height, which allows the sides walls 122 to extend from the ramp portion 104 to a free end 124 of the curved frame 102. Accordingly, each of the side walls 122 and the free ends 124 can form an uninterrupted top edge 126. The top edge 126 can extend from the free end 124 of the curved frame 102 to the dust pan blade 108. The top edge 126 can have a single obtuse angle (O) formed between the free end 124 and the sidewalls 122. The sidewalls 122 can be tapered, such that the height of the sidewall can decrease moving from the curved frame 102 to the dust pan blade 108.

The uninterrupted top edge 126 formed at the junction of the side walls 122 and free ends 124 provides certain improvements to the attachment 100. For example, the obtuse angle (θ) prevents catching the attachment 100 on other objects. Likewise, absence of any projections at this point improves structural rigidity, especially with respect to releasably engaging the rim engagement portion 102 with the rim 103 of the utility bucket 101. The improved integral configuration and obtuse angle (θ) of the uninterrupted top edge 126 formed at the junction of the side walls 122 and free ends 124 minimizes stresses and the number of structural transition points on the attachment 100 in releasably engaging the bucket 101, which can improve durability and reduce undesirable wear; e.g., cracking.

Where the sidewalls 122 extend to the free end 124 of the curved frame 102, the attachment 100 can have an increased internal volume for collecting and directing debris to the utility bucket 101. Advantageously, the height of the sidewalls 122 militates against debris falling out of the attachment 100 and not being funneled into the bucket 101. It should be appreciated that one skilled in the art can scale the height of the sidewalls 122, as desired.

Figure 3:
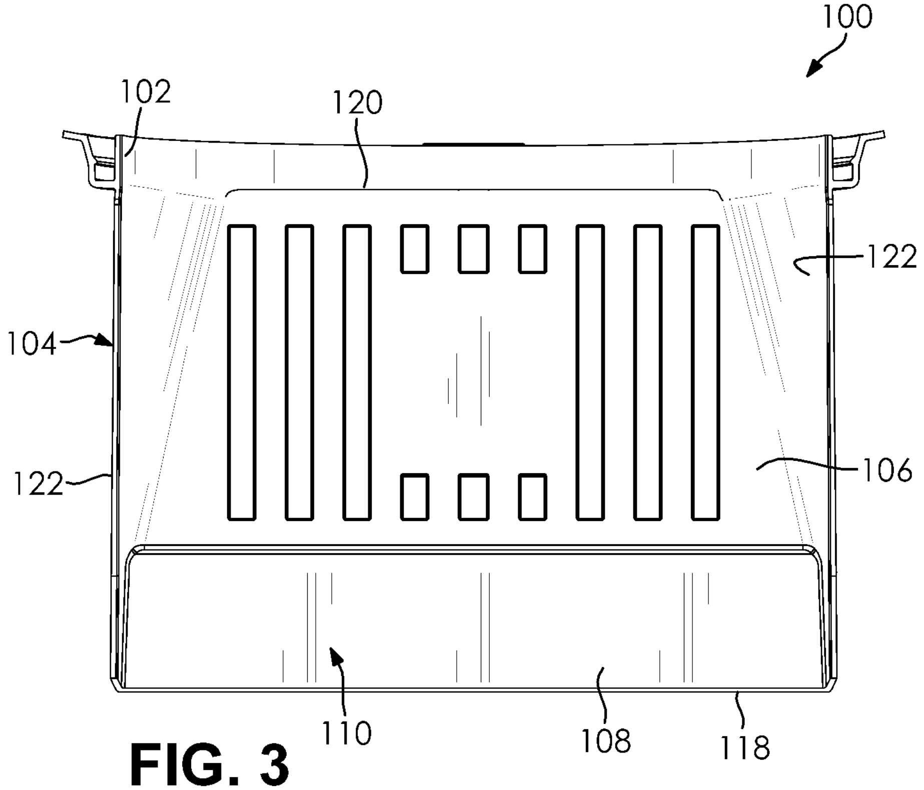
FIG. 3 is a top plan view of the dustpan of FIG. 1.
Figure 4:
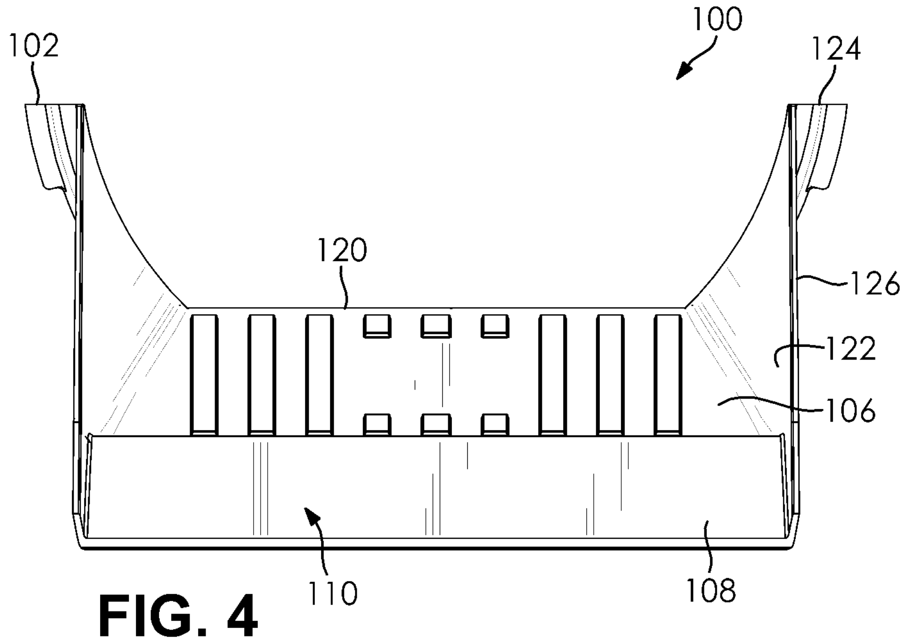
FIG. 4 is a front elevational view of the dust pan of FIG. 1.

With reference to FIG. 3, the upper surface 110 of the inclined portion 106 of the ramp 104 can have a substantially trapezoid shape. Accordingly, each of the sidewalls 122 can be disposed at an angle relative to the back edge 120 of the ramp 104. In particular, a distance between each of the sidewalls 122 can increase along a length extending from the back edge of the inclined portion to the free edge 118 of the dust pan blade 108. The free edge 118 of the dust pan blade 108 can, therefore, be longer than the back edge 120 of the inclined portion 106. Advantageously, the angle of the sidewalls can increase a collection area for debris, while funneling the debris into the utility bucket. In particular, the angle of the sidewalls 122 can allow a length the free edge 118 of the attachment 100 to be greater than a width of the utility bucket 101.

Additionally, the curved sidewalls 122 can have a curvature that is substantially the same as a curvature of the curved frame 102, and thus, substantially the same as a curvature of the rim 103 of the utility bucket 101. Both the angle and the curvature of the sidewalls 122 can allow the back edge 120 of the ramp portion 104 to be coextensive with a width of the utility bucket 101. In other words, the back edge 120 of the ramp portion 104 can be unobstructed by the curved frame 102 to allow debris to move from the ramp portion 104 into the utility bucket 101 without contacting or being blocked by the curved frame 102.

The waste retention wall can be seen spanning the area or segment area. The waste retention wall in conjunction with the ramp creates a ramped dam, where debris and waste pushed up the ramp and over the back edge 120 and into the bucket is substantially prevented from exiting the bucket due to being trapped behind the waste retention wall. The height of the waste retention wall is variable depending on the requirements of usage and the bucket size.

In one example, a standard utility bucket 101 can have an opening encircled by the rim 103 with a diameter of approximately 12 inches. The attachment 100 made to fit this example bucket 101 can have a curved frame 102 with a rim engagement groove having a diameter complementary to the diameter of the rim 103. The height of the waste retention wall can be varied from about one-half inch to about 8 inches, although a higher waste retention wall is possible, it can become impractical as the height approaches the length of the diameter. A height of approximately three inches is preferred. Of course, a larger or smaller diameter bucket can require the height be adjusted as a function of bucket rim diameter, groove diameter, or curved frame diameter. For example, the height can vary from about one-tenth to about one-half the diameter of either the bucket rim, the groove, or the curved frame 102. Heights below one-tenth of the diameter or above one-half of the diameter are also possible.

A utility bucket 101 can have a round opening and rim 103 is shown. However, the present attachment 100 can be used with buckets 101 of various opening shapes and configurations, such as a rectangular or oblong opening and rim 103. In the rectangular opening example, a rim engagement portion 102 can be a partial or whole square or rectangular frame which is shaped to engage the rectangular rim of the bucket. Further, the shape of the waste retention wall can vary accorded to the shape of the bucket. In the case of the illustrated round bucket, the waste retention wall can be shaped like a circular segment as described above. In the case of a square or rectangular bucket, the waste retention wall can also be rectangular or triangular if the attachment 100 is attached to one corner and two adjacent sides of the bucket.

The attachment 100 can be attached to a utility bucket 101 by engaging the rim 103 of the bucket. The bucket can be laying horizontally on its side, with the ramp 104 extending down to contact the support surface with the leading edge. The ramp portion 104 can also serve to stabilize the bucket 101 by contacting the support surface with the leading edge to prevent rolling.

The attachment 100 can further have a plurality of stacking tabs, including a first stacking tab and a second stacking tab. Each of the first stacking tab and the second stacking tab can be configured to allow other dust pans 100 to stack or nest on top of the attachment 100. Desirably, this permits the attachment 100 to be easily stacked or nested with other dust pans 100 to allow for better storage options. It should be appreciated that a skilled artisan can scale the number of the plurality of stacking tabs, as desired.

Advantageously, the attachment 100 can have certain advantages over similar devices. In particular, the present attachment 100 can include blade ribs 114, which can improve the structural integrity of the attachment 100. Other dust pan edges can become warped without the blade ribs 114, which can render the device unusable. The sidewalls 122 of the present device can extend to a free end 124 of a rim engagement portion 102, which can increase the collection area of the attachment 100. Undesirably, the sidewalls of other dust pans do not extend to the free end and are shorter than the sidewalls 122, which can lead to an overflow of debris, in operation. Finally, the angled and curved sidewalls 122 of the present disclosure improve the flow of material from the attachment 100 to the utility bucket 101. Other dust pans can have comparatively straighter sidewalls, which obstruct the back edge of the dust pan.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. An attachment for a utility bucket having a rim, the attachment comprising:

a rim engagement portion for engaging the rim of the utility bucket in releasably locked engagement;

a ramped portion extending from the rim engagement portion, the ramped portion including an inclined portion and a dust pan blade extending from the inclined portion, the inclined portion including a back edge being flat and elevated from the rim of the utility bucket, and the dust pan blade including a plurality of blade ribs formed on a bottom surface thereof;

sidewalls extending from a free edge of the dust pan blade to a free end of the rim engagement portion, the sidewalls being both angled and curved, wherein the back edge of the inclined portion is unobstructed by the sidewalls; and a rib disposed on a bottom surface of the attachment connecting the inclined portion to the rim engagement portion.

2. The attachment of claim 1, wherein the dust pan blade is disposed at an angle relative to the inclined portion and the dust pan blade is configured to contact the ground when attached to the utility bucket laid horizontally.

3. The attachment of claim 1, wherein the blade ribs extend a length of the dust pan blade.

4. The attachment of claim 1, wherein the blade ribs extend from the inclined portion to a free edge of the dust pan blade.

5. The attachment of claim 1, wherein the blade ribs are tapered.

6. The attachment of claim 5, wherein a height of each of the blade ribs gradually decreases along a length of the blade rib extending from adjacent to the inclined portion to a free edge of the dust pan blade.

7. The attachment of claim 1, wherein the blade ribs extend a length of the dust pan blade from the inclined portion to a free edge of the dust pan blade, and a height of each of the blade ribs gradually decreases along the length of the blade rib extending from adjacent to the inclined portion to a free edge of the dust pan blade.

8. The attachment of claim 1, wherein the inclined portion has a trapezoid shape.

9. The attachment of claim 1, wherein each of the sidewalls is disposed at an angle relative to the back edge of the inclined portion.

10. The attachment of claim 9, wherein a distance between the sidewalls increases from the back edge of the inclined portion to the dust pan blade.

11. The attachment of claim 1, wherein each of the sidewalls form an uninterrupted top edge with the free end of the rim engagement portion.

12. The attachment of claim 11, wherein the uninterrupted top edge has a single obtuse angle formed therein by an intersection of the sidewall and the free end of the rim engagement portion.

13. The attachment of claim 1, wherein the sidewalls have a curvature that is substantially the same as a curvature of the rim engagement portion.

14. The attachment of claim 13, wherein the curvature of the sidewalls is substantially the same as a curvature of the rim of the utility bucket.

15. The attachment of claim 1, wherein the back edge is coextensive with a width of the utility bucket.

16. The attachment of claim 1, wherein the blade ribs extend a length of the dust pan blade from the inclined portion to a free edge of the dust pan blade, and a height of each of the blade ribs gradually decreases along the length of the blade rib extending from adjacent to the inclined portion to a free edge of the dust pan blade.

17. The attachment of claim 1, wherein each of the sidewalls is disposed at an angle relative to the back edge of the inclined portion, and a distance between the sidewalls increases from the back edge of the inclined portion to the dust pan blade, and each of the sidewalls form an uninterrupted top edge with the free end of the rim engagement portion, and the uninterrupted top edge has a single obtuse angle formed therein by an intersection of the sidewall and the free end of the rim engagement portion.

18. The attachment of claim 1, wherein the blade ribs extend a length of the dust pan blade from the inclined portion to a free edge of the dust pan blade, and a height of each of the blade ribs gradually decreases along the length of the blade rib extending from adjacent to the inclined portion to a free edge of the dust pan blade and wherein each of the sidewalls is disposed at an angle relative to the back edge of the inclined portion, and a distance between the sidewalls increases from the back edge of the inclined portion to the dust pan blade, and each of the sidewalls form an uninterrupted top edge with the free end of the rim engagement portion, and the uninterrupted top edge has a single obtuse angle formed therein by an intersection of the sidewall and the free end of the rim engagement portion.

* * * * *